(12) United States Patent
Fox, III

(10) Patent No.: US 6,507,776 B1
(45) Date of Patent: Jan. 14, 2003

(54) AUTOPILOT FOR AIRCRAFT HAVING AUTOMATIC DESCENT FUNCTION IN THE EVENT OF CABIN DEPRESSURIZATION

(76) Inventor: Angus C. Fox, III, 4501 N. Windsor Dr., Provo, UT (US) 84604-6303

( * ) Notice: Subject to any disclaimer, the term of this patent is extended or adjusted under 35 U.S.C. 154(b) by 0 days.

(21) Appl. No.: 09/698,313

(22) Filed: Oct. 26, 2000

(51) Int. Cl.$^7$ .................................................. G05D 1/00
(52) U.S. Cl. .............................. 701/11; 701/5; 701/10; 244/76 R; 244/180; 244/190
(58) Field of Search ..................... 701/3, 4, 5, 6, 701/7, 8, 9, 10, 11, 18; 244/13, 119, 118.5, 194, 12.1, 76 R, 203, 181, 180, 14, 23, 120–122, 190–197; 416/1, 27–48; 180/116, 117; 454/73; 318/584

(56) References Cited

U.S. PATENT DOCUMENTS

| | | | | |
|---|---|---|---|---|
| 3,940,673 A | * | 2/1976 | Darlington | 318/584 |
| 4,094,480 A | * | 6/1978 | Nixon | 244/180 |
| 4,224,669 A | * | 9/1980 | Brame | 701/8 |
| 4,314,341 A | * | 2/1982 | Kivela | 701/16 |
| 4,490,794 A | * | 12/1984 | Griffith et al. | 701/8 |
| 4,773,307 A | * | 9/1988 | Goodman | 454/73 |
| 4,825,374 A | * | 4/1989 | King et al. | 701/5 |
| 6,171,055 B1 | * | 1/2001 | Vos et al. | 416/1 |
| 6,244,540 B1 | * | 6/2001 | Stabile et al. | 244/118.5 |

* cited by examiner

Primary Examiner—Jacques H. Louis-Jacques
(74) Attorney, Agent, or Firm—Angus C. Fox, III

(57) ABSTRACT

An emergency control system permits an aircraft to recover from a catastrophic loss of cabin pressure even if the pilot becomes incapacitated before he is able to activate an emergency oxygen system. An autopilot system is programmed for rapid descent, in response to a cabin depressurization condition detected by an air pressure sensor, to a flight level where there is sufficient oxygen in the atmosphere to sustain full consciousness. When in the rapid descent mode, the autopilot cuts engine power to idle, reduces the angle of attack, maximizes parasitic drag, and initiates a maximum descent rate without exceeding the aircraft's design limitations. As the aircraft approaches a lower altitude capable of sustaining full human consciousness, the autopilot system increases the angle of attack, reduces parasitic drag, and increases engine power, thereby causing the aircraft to fly level at the lower altitude until the pilot reasserts control of the aircraft.

20 Claims, 2 Drawing Sheets

AUTOPILOT FOR AIRCRAFT HAVING AUTOMATIC DESCENT FUNCTION IN THE EVENT OF CABIN DEPRESSURIZATION

FIELD OF THE INVENTION

This invention relates to aircraft autopilot systems, as well as to aircraft systems designed to cope with catastrophic loss of cabin air pressure.

BACKGROUND OF THE INVENTION

On Oct. 25, 1999, Payne Stewart, one of the best players on the Professional Golf Association (PGA) tour, with victories in 18 tournaments around the world, including three major championships, died along with five other individuals after the cabin of the eight-passenger Learjet Model 35 in which they were flying apparently abruptly lost cabin pressure as the aircraft was climbing to a cruise altitude of 39,000 feet. After all aboard lost consciousness, the eight-passenger twin-turbofan business jet continued to fly a heading maintained by its autopilot for some 1,500 miles until the fuel on board was depleted, whereupon the plane plummeted to earth at high speed.

At or near an altitude of 40,000 feet, incapacitation occurs almost immediately if cabin pressure is lost. In aviation jargon, there is a term known as "time of useful consciousness." It is the measure of the time the body can cope without oxygen, and it diminishes in almost direct proportion to the increase in altitude. At 20,000 feet, the time is 10 minutes; at 26,000 feet, it is two minutes; at 30,000 feet, it is 30 seconds; and at 40,000 feet, it is 15 seconds. At the higher altitudes, irreversible brain damage is quickly followed by death. It has been speculated that if decompression of the accident were due to a blown-out window, not only would decompression have occurred almost immediately, but the temperature within the cabin would have dropped almost as rapidly to 50 degrees Fahrenheit below zero.

The death of Payne Stewart and his colleagues were not the first attributable to cabin decompression. It has been reported that some military pilots have died after blacking out from the lack of oxygen at high altitudes. However, the best-known incident dates back to Jan. 10, 1980, when Louisiana State University football coach Bo Rein and his pilot were killed in a crash reminiscent of the Payne Stewart tragedy.

Rein's aircraft, a Cessna Conquest, departed Shreveport, La. for what was to have been a short hop to Baton Rouge. During the flight, controllers lost contact with the pilot. The plane climbed to 41,000 feet, heading on a straight-line course to the Virginia coast. Military jets intercepted the Cessna, but pilots could see no signs of life within the cabin-only the glow of the instrument panel's indicator lights. Three and a half hours after the flight began, the plane fell out of the sky and crashed into the Atlantic. No debris or remains were recovered. Although the National Transportation Safety Board was unable to ascertain the cause of the crash, the events were consistent with a loss of cabin pressure.

What is needed is an aircraft recovery system that will prevent tragedies such as those recounted above.

SUMMARY OF THE INVENTION

The present invention provides an emergency control system for an aircraft to recover from a catastrophic loss of cabin pressure even if the pilot becomes incapacitated before he is able to activate an emergency oxygen system.

For one embodiment of the invention, an automatic pilot (autopilot) system is programmed for rapid descent, in response to a cabin depressurization condition detected by a air pressure sensor, to a flight level where there is sufficient oxygen in the atmosphere to sustain full consciousness of the pilot. For a second embodiment of the invention, the rapid descent function may be activated by a single input of the pilot, such as depressing an activation button. For a preferred embodiment of the invention, both modes of activation are available. In the event of gradual decompression of the aircraft, it is possible that the pilot might become gradually disoriented and eventually lose consciousness without having realized the need to activate the automatic descent function of the autopilot. Therefore, it is deemed highly preferable that the automatic descent function be automatically deployable by a cabin pressurization sensor. In either case, the rapid descent function of the autopilot system is programmed to reduce engine power settings to a minimum and simultaneously reduce the angle of attack and put the aircraft in its maximum slip configuration, thereby placing the aircraft in a steep, but safe, dive. As the aircraft approaches a lower altitude capable of sustaining full human consciousness, the autopilot system increases the angle of attack and eliminates the slip and increases engine power, causing the aircraft to fly level at the lower altitude until the pilot retakes control of the aircraft. Airspeed during the dive is monitored so that it does not exceed the aircraft's design limits. In calm air, the maximum safe speed is VNE. In turbulent air, that speed should be reduced accordingly. The maximum speed during the dive may be set by inputs from a turbulence detector over a fixed period (e.g., five minutes) prior to the autopilot beginning the rapid descent function. An instrument such an accelerometer (i.e., a g meter) may be used as the turbulence detector.

To prevent autopilot malfunction from creating a dangerous control situation, a short audible, visible or other sensory detectible warning given by the autopilot system prior to commencing a rapid descent is advisable, thereby providing the pilot with the opportunity to manually override the autopilot system in advance. For a preferred embodiment of the system, the autopilot is programmed to deactivate the rapid descent function at altitudes below a maximum safe altitude (MASA). The average human being cannot function well for long at altitudes in excess of 12,000 feet. Therefore, MASA is best set at or near that figure. Nearly all autopilot systems have the additional safety feature that they are physically overridable by the pilot. In other words, the forces applied to the controls of an aircraft by the autopilot system are not so strong that they cannot be easily overridden by the average person.

In order to prevent collisions of the aircraft with high-altitude terrain when the rapid descent function of the autopilot is activated, the autopilot is preferably coupled to a global positioning system (GPS) having a database in which is stored the altitude values for at least all obstacles having an altitude greater than about 1,000 feet less than the consciousness-sustaining altitude at which the system is designed to level out after diving during a rapid descent event. The GPS is equipped with a look ahead function which selects a safe low altitude route away from high-level terrain whenever the rapid descent function of the autopilot is activated. Thus, the slipping dive to a safe altitude may be coupled with one or more turns for terrain avoidance.

DETAILED DESCRIPTION OF THE INVENTION

Without oxygen, the brain begins to suffer irreversible damage within five minutes. Death follows in only a few more minutes. Thus, in case of rapid depressurization of an aircraft, the challenge is to get that aircraft to an altitude where consciousness may be regained as quickly and as safely as possible. The longer an individual is unconscious, the longer full recovery will take. Although Mt. Everest has been climbed without supplemental oxygen by individuals who had previously acclimated themselves to high elevations, those climbers did suffer some permanent brain damage as a result of the experience. Although disorientation and delirium may soon occur at around 14,000 to 15,000 feet elevation for someone accustomed to living near sea level, permanent brain damage normally does not occur rapidly below 20,000 feet elevations, although a person may be intellectually incapacitated. During normal flight, most commercial aircraft descend at around 1,000 feet per minute. However, if an aircraft is flying at an altitude of 40,000 feet, a descent at a normal rate would likely leave the occupants dead. Although much more rapid descents are possible, the build-up of airspeed becomes a critical factor. This is especially true of high-performance aircraft. When the nose is lowered, they rapidly approach their maximum safe airspeed. Even with the landing gear down and flaps deployed, unsafe airspeeds are rapidly attained if the pilot attempts to lose altitude too rapidly. It is well known by aerobatic and sport pilots that the fastest way to safely lose altitude is to put the aircraft in a slip, a maneuver where the aircraft is cross-controlled such that is turned away from its direction of travel, with the entire fuselage is acting as an air brake. Even airliners can be slipped to rapidly lose altitude. When the Boeing 767 airliners entered service, several of those planes experienced problems with the fuel gage inaccuracy. One plane completely ran out of fuel on a cross-country flight. Fortunately, the pilot was able to borrow from his extensive experience at the controls of a glider, and slipped the aircraft to a landing on an abandoned runway where locals were staging a drag racing event.

Aircraft, whether they be airliners or smaller business jets, seldom fly at altitudes greater than 40,000 feet. Thus, the challenge is to bring an aircraft which experiences a catastrophic loss of cabin pressure at this altitude to a lower altitude with sufficient haste that the pilot can quickly regain consciousness and retake control of the aircraft.

Figure 1:
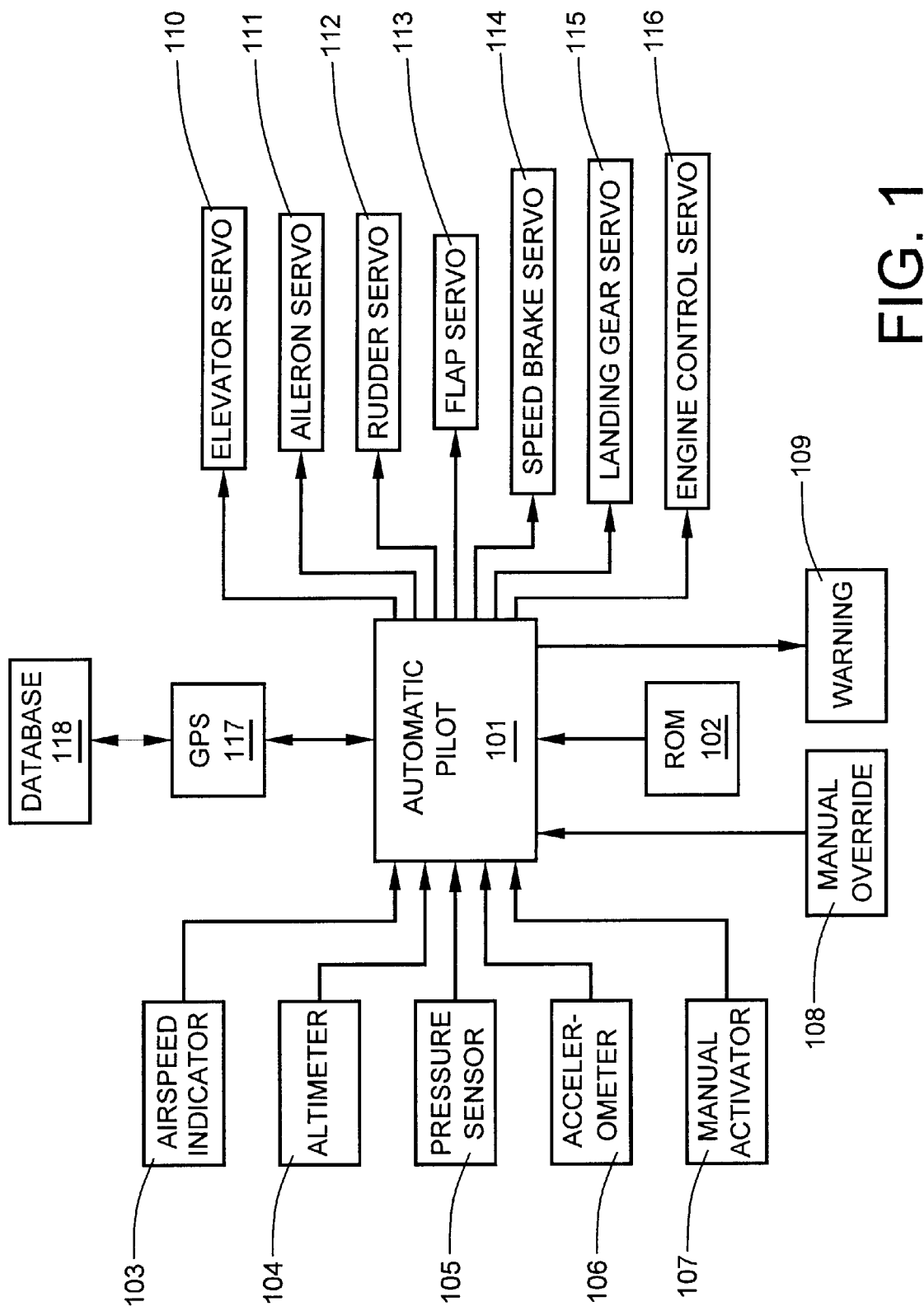
FIG. 1 is a block diagram of the new emergency control system for aircraft.

Referring now to FIG. 1, a flight recovery system 100 includes an automatic pilot (autopilot) system 101 that is programmed from a read only memory (ROM) 102 for rapid descent, in response to a cabin depressurization condition detected by a air pressure sensor 105, to a flight level where there is sufficient oxygen in the atmosphere to sustain full consciousness of the pilot. For a second embodiment of the invention, the rapid descent function may be activated by a single input of the pilot, such as depressing an activation button 107. For a preferred embodiment of the invention, both modes of activation are available. In the event of gradual decompression of the aircraft, it is possible that the pilot might become gradually disoriented and eventually lose consciousness without having realized the need to activate the automatic descent function of the autopilot. Therefore, it is deemed highly preferable that the automatic descent function be automatically deployable by a cabin pressurization sensor 105. In either case, the rapid descent function of the autopilot system is programmed to reduce engine power settings via an engine control servo 116 to a minimum and simultaneously reduce the angle of attack and put the aircraft in its maximum slip configuration, thereby placing the aircraft in a steep, but safe, dive. The autopilot 101 asserts control over the aircraft via an elevator servo 110, an aileron servo 111, a rudder servo 112, a flap servo 113, and a speed brake servo 114 if existent. Maximum airspeed may also be reduced by extending the landing gear. Landing gear extension is accomplished via the landing gear servo 115. The servos may be actuated by differential pressure, hydraulic pressure, or electrical power. As the aircraft approaches a lower altitude capable of sustaining full human consciousness, the autopilot system increases the angle of attack and eliminates the slip, causing the aircraft to fly level at the lower altitude until the pilot retakes control of the aircraft. Airspeed during the dive is monitored with an airspeed indicator 103 so that the aircraft does not exceed its structural design limits. In calm air, the maximum stated safe speed is $V_{NE}$. In turbulent air, the maximum safe speed must be reduced somewhat to compensate for the increased structural loads on the airframe. As a practical matter, the $V_{NE}$ value is a conservative figure. The breakup speed is probably more than double the $V_{NE}$ figure. Using the inputs that it receives from the airspeed indicator 103, the altimeter 104, and the accelerometer 106, the autopilot 101 can maintain the downward vertical speed at the highest possible value consistent with the known structural load limits of the aircraft. The idea is to maximize downward vertical speed without exceeding a safe airspeed. A downward vertical speed of 10,000 feet per minute equates to about 113.6 miles per hour. In a normal flight configuration, such a vertical speed would be possible only if the aircraft were dangerously exceeding its $V_{NE}$. By increasing the drag with a slip configuration and extended flaps and landing gear, extremely rapid descents are possible. The maximum speed during the dive may be set by inputs from a turbulence detector over a fixed period (e.g., five minutes) prior to the autopilot beginning the rapid descent function. An instrument such an accelerometer (i.e., a g meter) 106 may be used as the turbulence detector.

To prevent autopilot malfunction from creating a dangerous control situation, a short audible, visible or other sensory detectible warning 109 given by the autopilot system prior to commencing a rapid descent sequence is advisable, thereby providing the pilot with the opportunity to select a manual override 108 of the autopilot system in advance. For a preferred embodiment of the system, the autopilot is programmed to deactivate the rapid descent function at altitudes below a maximum safe altitude (MASA). The level-out altitude after a pressure-failure induced dive is set no higher than the MASA. The altimeter 104 provides constant inputs to the autopilot 101. The average human being cannot function well for long at altitudes in excess of 12,000 feet. Therefore, MASA is best set at or near that figure. Nearly all autopilot systems have the additional safety feature that they are physically overridable by the pilot. That is to say, the forces applied to the controls of an aircraft by the autopilot system are not so strong that they cannot be easily overridden by the average person.

In order to prevent collisions of the aircraft with high-altitude terrain when the rapid descent function of the autopilot is activated, the autopilot 101 is preferably coupled to a global positioning system (GPS) 117 having a database 118 in which is stored the altitude values for at least all obstacles having an elevation within 1000 feet of the set level-out altitude. The GPS 117 is equipped with a look ahead function which selects a safe low altitude route away from high-level terrain whenever the rapid descent function of the autopilot is activated. Thus, the slipping dive to a safe altitude may be coupled with one or more turns for terrain avoidance.

Figure 2:
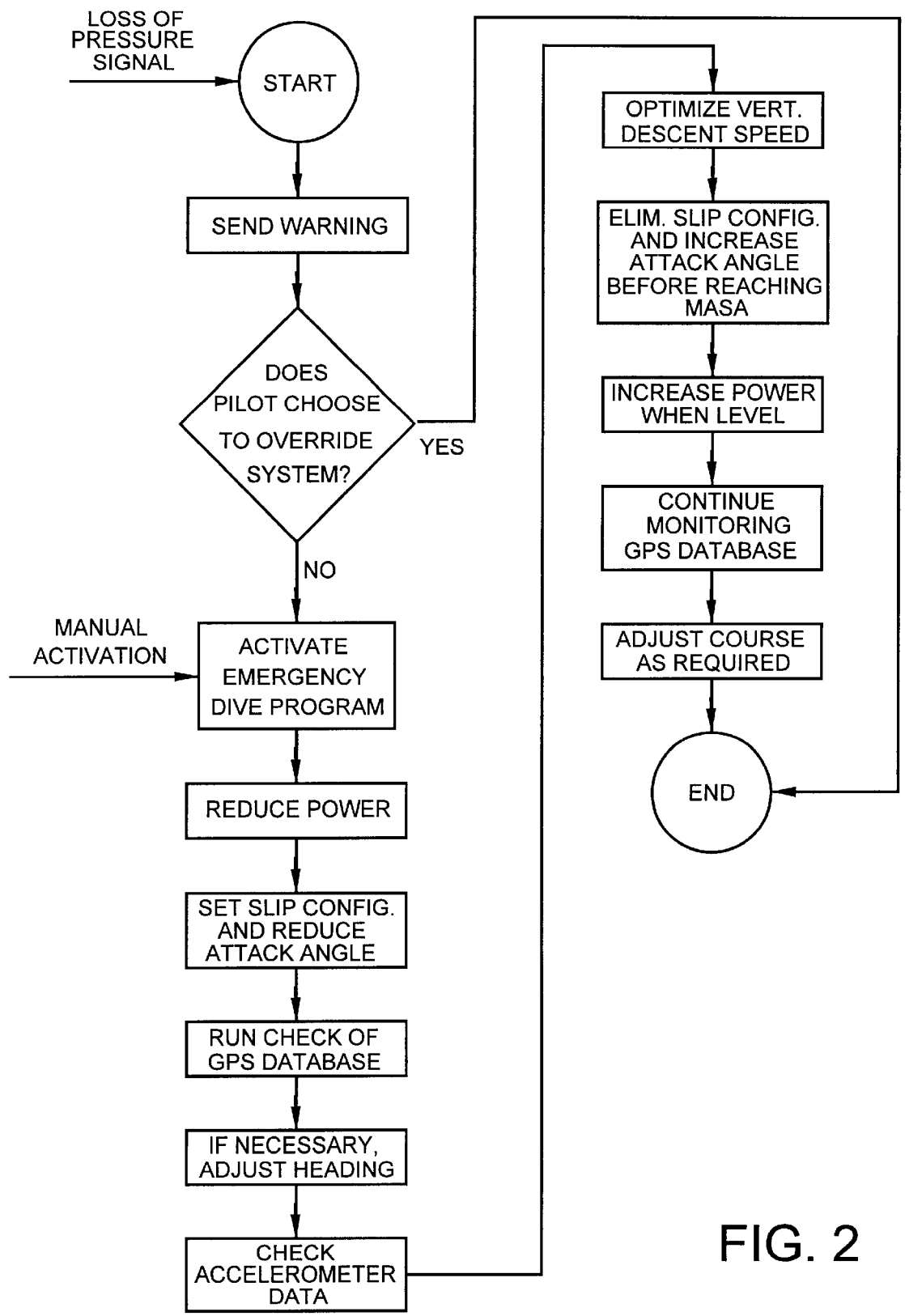
FIG. 2 is a flow chart for implementing the emergency control process.

Referring now to the flow chart of the emergency control process in FIG. 2, the process of rapid automatic rapid descent begins with a signal from the pressure sensor 106, which indicates that the cabin has experienced a catastrophic loss of pressure. A warning is sent to the pilot to alert him of the loss of cabin pressure. At this point, the pilot may chose to override the system. If he does not override the recovery system, the emergency dive program is activated. It may also be activated manually. Once the program is activated, power is immediately cut to idle, the aircraft is set up in a slip configuration and the angle of attack is reduced to place the aircraft in a dive. A check is run of the GPS database 109, and in correlation with the present position as determined by the GPS 108, the heading is adjusted if required to avoid high terrain. Accelerometer data is also checked for the presence of turbulence. Vertical descent speed is optimized for the turbulence conditions and the structural capability of the aircraft. Pull-out from the dive is made so that the aircraft levels out at the maximum safe altitude or a lower altitude if the terrain so permits. The slip configuration is eliminated and the angle of attack is increased on pull-out. At such a recovery altitude, consciousness of the pilot can be restored. The autopilot increases power and maintains level flight until the pilot recovers and retakes control of the aircraft. While the pilot is incapacitated, monitoring of the GPS database continues and the course of the aircraft is adjusted as necessary.

Although it is suggested herein that a slip be employed for rapid descent, any technique which employs greatly increased drag may be used to hasten descent of the aircraft. For example, spoilers and air brakes may be used effectively. However, it is believed that slipping the aircraft provides the greatest amount of parasitic drag for rapid descents.

What is claimed is:

1. An emergency control system for an aircraft to recover from a catastrophic loss of cabin pressure even if the pilot becomes incapacitated before he is able to activate an emergency oxygen system, said system comprising:
    an autopilot system programmed to initiate a recovery procedure whereby a maximum safe rate of descent is initiated and maintained by increasing parasitic drag of the aircraft, principally through the use of a slip condition, in response to a cabin depressurization condition detected by a air pressure sensor, to an altitude where there is sufficient oxygen in the atmosphere to sustain full consciousness of the pilot.

2. The emergency control system of claim 1, wherein the recovery procedure may also be activated by a single input of the pilot.

3. The emergency control system of claim 1, wherein parasitic drag is further increased through at least one of the following techniques: deploying spoilers; extending landing gear; extending flaps.

4. The emergency control system of claim 1, whereby said autopilot is also programmed to reduce engine power settings to idle and reduce the aircraft's angle of attack in response to a cabin depressurization condition.

5. The emergency control system of claim 4, whereby said autopilot is also programmed to increase power, reduce parasitc drag, and increase the aircraft's angle of attack when an altitude is reached where there is sufficient oxygen in the atmosphere to sustain full consciousness of the pilot.

6. The emergency control system of claim 1, wherein said autopilot is coupled to a global positioning system (GPS) having a database in which is stored altitude values for at least all obstacles above or within about 1000 feet below a fixed maximum safe level-out altitude, and said GPS is equipped with a look ahead function which selects a safe low altitude route away from such obstacles whenever the recovery function is implemented.

7. The emergency control system of claim 6, wherein the maximum safe rate of descent is continued to that the aircraft will level out at the maximum safe altitude or a lower altitude if the terrain so permits.

8. The emergency control system of claim 1, wherein accelerometer data is monitored during the descent in order to ascertain whether there is turbulence, and vertical descent speed is optimized for the turbulence conditions and the structural capability of the aircraft.

9. In combination with an aircraft having at least one engine, retractable landing gear, and flaps, an emergency control system for an aircraft to recover from a catastrophic loss of cabin pressure even if the pilot becomes incapacitated before he is able to activate an emergency oxygen system, said system comprising:
    an air pressure sensor which constantly monitors cabin air pressure at least when the aircraft is above a maximum safe altitude;
    an autopilot system programmed to initiate and maintain a maximum safe rate of descent by increasing parasitic drag of the aircraft principally through the use of a slip condition, in response to a cabin depressurization condition detected by said air pressure sensor, until the aircraft reaches an altitude where there is sufficient oxygen in the atmosphere to sustain full consciousness of the pilot.

10. The emergency control system of claim 9, wherein the autopilot also reduces engine power settings to idle and decreases the aircraft's angle of attack in response to a cabin depressurization condition.

11. The emergency control system of claim 10, wherein the aircraft's parasitic drag is further increased through at least one of the following techniques: extending the landing gear; extending flaps.

12. The emergency control system of claim 11, wherein said aircraft is also equipped with spoilers, and parasitic drag may be further increased by deploying said spoilers.

13. The emergency control system of claim 9, wherein said autopilot is also programmed to increase power, reduce parasitc drag, and increase the aircraft's angle of attack when an altitude is reached where there is sufficient oxygen in the atmosphere to sustain full consciousness of the pilot.

14. The emergency control system of claim 9, which further comprises a global positioning system (GPS) which is coupled to the autopilot, said GPS having a database in which is stored altitude values for at least all obstacles above or within about 1000 feet below a fixed maximum safe level-out altitude, and said GPS is equipped with a look ahead function which selects a safe low altitude route away from such obstacles which the autopilot follows whenever it assumes control of the aircraft in the event of catastrophic cabin pressure loss.

15. The emergency control system of claim 14, wherein the maximum safe rate of descent is maintained until the maximum safe altitude is reached or, if the terrain so permits, until an altitude lower than the maximum safe altitude is reached.

16. The emergency control system of claim 9, wherein a maximum safe rate of descent controlled by the autopilot may also be initiated by a single pilot input.

17. The emergency control system of claim 9, whereby in order to prevent autopilot malfunction from creating a dangerous control situation, a sensorially detectible warning is given prior to the autopilot assuming control of the aircraft in response to a catastrophic loss of cabin pressure.

18. In combination with an aircraft having at least one engine, retractable landing gear, and flaps, an emergency control system for an aircraft to recover from a catastrophic loss of cabin pressure even if the pilot becomes incapacitated before he is able to activate an emergency oxygen system, said system comprising:

an air pressure sensor which constantly monitors cabin air pressure at least when the aircraft is above a maximum safe altitude;

an autopilot system programmed to reduce engine power settings to idle, maximize parasitic drag principally by slipping the aircraft, reduce the aircraft's angle of attack, and thereby initiate and maintain a maximum safe rate of descent, in response to a cabin depressurization condition detected by said air pressure sensor, said autopilot system also programmed to increase power, reduce parasitc drag, and increase the aircraft's angle of attack when an altitude is reached where there is sufficient oxygen in the atmosphere to sustain full consciousness of the pilot.

19. The emergency control system of claim 18, which further comprises a GPS coupled to said autopilot, said GPS having a database in which is stored altitude values for at least all obstacles above or within about 1000 feet below a fixed maximum safe level-out altitude, and said GPS is equipped with a look ahead function which selects a safe low altitude route away from such obstacles which the autopilot follows whenever it assumes control of the aircraft in the event of catastrophic cabin pressure loss.

20. The emergency control system of claim 18, wherein the aircraft's parasitic drag is increased through at least one of the following additional techniques: extending the landing gear; extending flaps; deploying spoilers.

* * * * *